April 26, 1932.   R. H. BROWN   1,855,567
COLLAPSIBLE CART
Filed May 15, 1929   2 Sheets-Sheet 1

Inventor.
Reinhardt H. Brown,
By John Howard McElroy
HIS Atty

April 26, 1932.   R. H. BROWN   1,855,567
COLLAPSIBLE CART
Filed May 15, 1929   2 Sheets-Sheet 2

Inventor:
Reinhardt H. Brown,
By John Howard McElroy
his Atty.

Patented Apr. 26, 1932

1,855,567

UNITED STATES PATENT OFFICE

REINHARDT H. BROWN, OF LA PORTE, INDIANA

COLLAPSIBLE CART

Application filed May 15, 1929. Serial No. 363,186.

My invention is concerned with children's collapsible vehicles, and is designed to produce a device of the class described that shall be extremely simple and light weight in its construction, and which can be collapsed into a small compass for transportation by hand.

To illustrate my invention, I annex hereto two sheets of drawings, in which the same reference characters are used to designate identical parts in all the figures, of which,—

Figure 1:
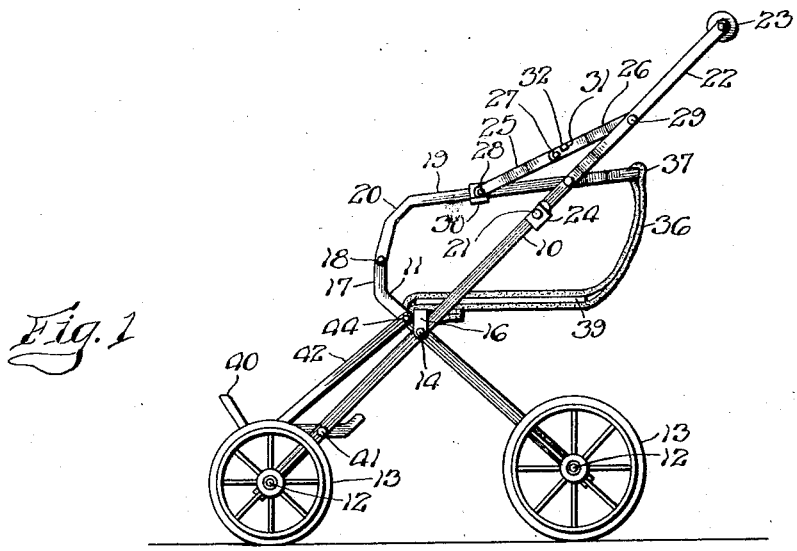
Fig. 1 is a side elevation of a cart in its extended position.

In carrying out my invention in its preferred form, I employ a front-wheel frame 10 and a rear-wheel frame 11, both of which are preferably made of strap metal and are U-shaped in their general outline, and each preferably has an axle 12 secured therein adjacent the cross piece, upon the ends of which are journaled the wheels 13 in the customary manner. These front and rear wheel frames 10 and 11 are pivoted together at 14 by rivets, and are preferably further connected at this point by the transversely-extending seat-supporting bar 15, which has at each end the downwardly projecting ears 16 by which it is pivoted to the wheel frames by the same rivets 14. The upper and forward end of the rear-wheel frame 11 is preferably turned upward, as seen at 17, and is pivoted at 18 to the open ends of the generally U-shaped back-rest frame 19, which is similar in its general construction to the wheel frames, and has its forward open end turned downward, as at 20, to meet the upturned end 17 of the rear-wheel frame. The upper ends of the front-wheel frame 10 are pivotally connected by the rivets 21 to the lower end of the generally U-shaped handle frame 22, which is preferably composed of two side pieces connected by the handle 23. The joints between these two frames are limited in their movement by the provision of a pair of U-shaped clips 24, which are secured in place by the rivets 21, and serve to limit the backward movement of the handle 22, so that the front-wheel frame and the handle frame can be extended in a straight line, but not moved any farther back.

Figure 2:
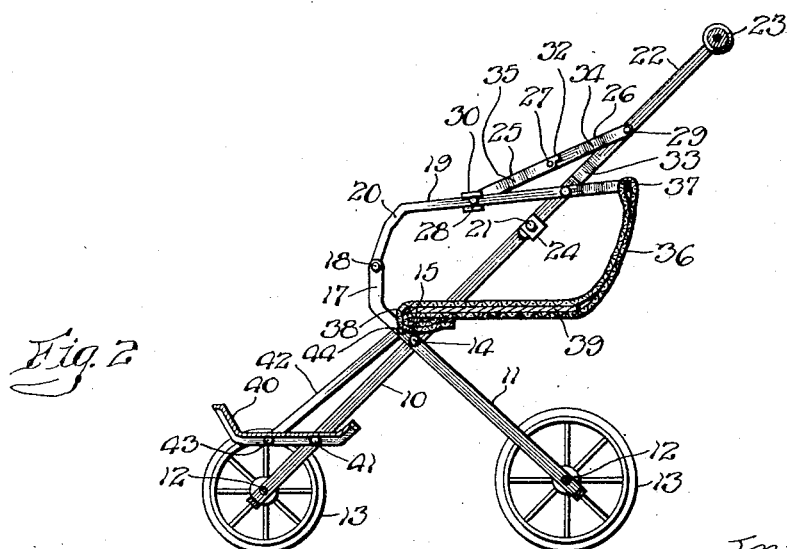
Fig. 2 is a central vertical longitudinal section in the same position.

To lock the various frames in the extended position shown in Figs. 1 and 2, I provide a locking means, which preferably consists of a pair of toggles made up at each side of two bars 25 and 26 pivoted to each other at 27 and to the back-rest frame 19 and the handle frame 22 at 28 and 29, respectively, the bars 25 and the back-rest frame 19 being preferably separated at their pivotal point by the interposed washer 30, which is Z-shaped in its vertical, transverse cross-section, so that the top flange engages the top of the back-rest frame, while the bottom flange engages the under side and end of the link 25. The bars 26 have formed therein, near the pivots 27, the recesses 31 adapted to receive the tongues 32 turned over from the ends of the bars 25 to prevent their passing a straight line when they are moved into locking position.

Figure 3:
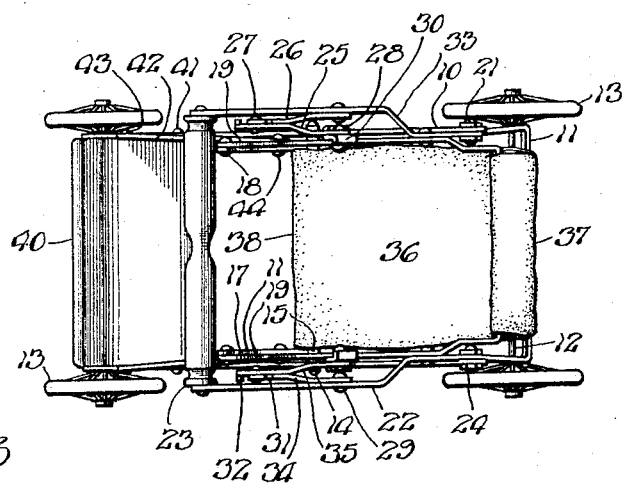
Figs. 3 and 4 are a top plan view and a side elevation, respectively, of the cart in its collapsed position.
Figure 4:
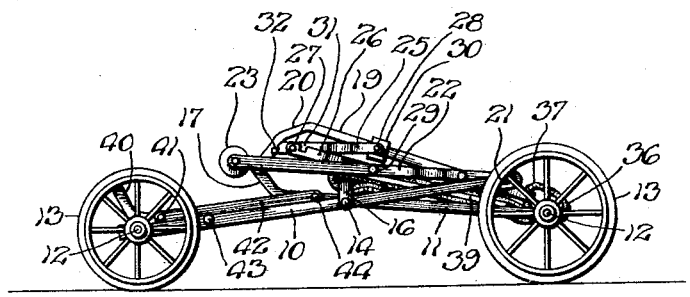

As best seen in Fig. 3, the bars 22 of the handle frame have formed therein the offsets 33, and the bars 26 have formed therein the offsets 34, and the bars 25 have formed therein the offsets 35, so that when the parts are collapsed, as seen in Fig. 3, the bars 25 and 26 can be folded in between the back-rest and handle frames. It will be obvious that, when the toggles are broken, the handle can be swung over anti-clockwise, the pivot 21 acting as a fulcrum and the back-rest frame as the load, with the handle 22 operating as a lever of the second class, until the parts are swung into the position shown in Fig. 4. When the movement is reversed, the parts are extended as shown, and the toggles being straightened out, the framework is securely locked in the position shown.

The seat and back rest are preferably formed of an elongated strip of fabric 36, which may be doubled as shown, with the upper end of the combined seat and back rest forming a loop at 37 over the cross piece of the back-rest frame 19. Another loop is formed at the other end, at 38, around the cross bar 15, and to form a rigid or semirigid seat, I interpose between the folds the plate 39, which may be of heavy cardboard, or any other desired material, the forward end of which will forcibly rest on the bar 15 so as to be supported thereby.

I also preferably provide a foot rest 40, which may conveniently consist of a plate of sheet metal of the shape shown in cross cection, and secured to the front-wheel frame 10 by the rivets 41. In order to more perfectly collapse the structure, I preferably provide the pair of links 42 pivoted to the foot rest at their lower ends at 43, and to the rear-wheel frame at their upper ends at 44. The foot rest 40 is preferably formed of a sheet-metal stamping with the ends thereof turned down, as shown, to form flanges for the reception of the rivets 41 and 43.

While I have shown and described my invention as embodied in the form which I at present consider best adapted to carry out its purposes, it will be understood that it is capable of some modification, and that I do not desire to be limited in the interpretation of the following claims except as may be necessitated by the state of the prior art.

What I claim as new, and desire to secure by Letters Patent of the United States, is:

1. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically extending ears to the front-wheel and rear-wheel frames at their pivot points, and a seat member secured at its front end to the seat-supporting bar and at its rear end to a transverse portion of one of the frames, said frame being adapted to collapse toward a substantially common and substantially horizontal plane when the handle is swung forwardly.

2. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically extending ears to the front-wheel and rear-wheel frames at their pivot points, a seat member secured at its front end to the seat-supporting bar and at its rear end to a transverse portion of one of the frames, and means for locking the parts in their extended position, said frames being adapted to collapse toward a substantially common and substantially horizontal plane when the handle is swung forwardly.

3. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, a seat member secured at its front end to the seat-supporting bar and at its rear end to a transverse portion of one of the frames, and means for locking the parts in their extended position, said means consisting of a toggle joint secured at one end to the handle frame and at the other end to the horizontal frame, said frames being adapted to collapse toward a substantially common and substantially horizontal plane when the handle is swung forwardly.

4. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, and a seat member consisting of a strip of flexible material looped at one end about the seat-supporting bar and at the other end about a transverse portion of one of the frames and having a non-flexible plate therein adjacent the seat-supporting bar, said frames being adapted to collapse toward a substantially common and substantially horizontal plane when the handle is swung forwardly.

5. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, a seat member secured at its front end to the seat-supporting bar and at its rear end to a transverse portion of one of the frames, and a foot rest supported on the front-wheel frame toward the lower end thereof, said frames being adapted to collapse toward a substantially common and substantially horizontal plane when the handle is swung forwardly.

6. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, a seat member secured at its front end to the seat-supporting bar and at its rear end to a transverse portion of one of the frames, a foot rest pivoted in the front-wheel frame toward its lower end, and links connecting the foot rest with the rear-wheel frame, said frames being adapted to collapse toward a substantially common and substantially horizontal plane when the handle is swung forwardly.

7. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, a seat member secured at its front end to the seat-supporting bar and at its rear end to a transverse portion of one of the frames, a foot rest pivoted in the front-wheel frame toward its lower end, and links connecting the foot rest with the rear-wheel frame and extending substantially parallel with the front-wheel frame, said frames being adapted to collapse toward a substantially common and substantially horizontal plane when the handle is swung forwardly.

8. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, a seat member secured at its front end to the seat-supporting bar and at its rear end to a transverse portion of one of the frames, and means for locking the parts in their extended position, said means consisting of a toggle joint secured at one end to the handle frame and at the other end to the horizontal frame, the handle frame having offsets therein so that when the bar is collapsed the folded toggles lies between the horizontal frame and the handle frame.

9. In a device of the class described, the combination with a U-shaped front-wheel frame, of a U-shaped rear-wheel frame pivoted thereto, a U-shaped handle frame pivoted to the open upper end of the front-wheel frame, a horizontal frame pivoted at its open forward end to the open upper end of the rear-wheel frame and toward the rear thereof to the handle frame, a seat-supporting bar pivoted by vertically-extending ears to the front-wheel and rear-wheel frames at their pivot points, and a seat member secured at its front end to the seat-supporting bar and at its rear end to a transverse portion of one of the frames, the horizontal frame having its open forward end turned downwardly and the rear-wheel frame having its open upper end turned vertically upward to meet the open forward end of the horizontal frame, said frames being adapted to collapse toward a substantially common and substantially horizontal plane when the handle is swung forwardly.

10. In a device of the class described, the combination with a U-shaped front-wheel frame, of a U-shaped rear-wheel frame pivoted thereto, a U-shaped handle frame pivoted to the open upper end of the front-wheel frame, a U-shaped horizontal frame pivoted at its open forward end to the open upper end of the rear-wheel frame and pivoted intermediate its ends to the handle frame, a seat-supporting bar pivoted by vertically extending ears to the front-wheel and rear-wheel frames at the pivot points, and a seat member secured at its front end to the seat-supporting bar and at its rear end to the transverse portion of the horizontal frame, said frames being adapted to collapse toward a substantially common and substantially horizontal plane when the handle is swung forward.

11. In a device of the class described, the combination with a U-shaped front-wheel frame, of a U-shaped rear-wheel frame pivoted thereto, a U-shaped handle frame pivoted to the open upper end of the front-wheel frame, a U-shaped horizontal frame pivoted at its open forward end to the open upper end of the rear-wheel frame and pivoted intermediate its ends to the handle frame, a seat-supporting bar pivoted by vertically extending ears to the front-wheel and rear-wheel frames at their pivot points, a seat member secured at its front end to the seat-supporting bar and at its rear end to the transverse portion of the horizontal frame, and means for locking the parts in their extended position, said frames being adapted to collapse toward a substantially common and substantially horizontal plane when the handle is swung forward.

12. In a device of the class described, the combination with a U-shaped front-wheel frame, of a U-shaped rear-wheel frame pivoted thereto, a U-shaped handle frame pivoted to the open upper end of the front-wheel frame, a U-shaped horizontal frame pivoted at its open forward end to the open upper end of the rear-wheel frame and pivoted intermediate its ends to the handle frame, a seat-supporting bar pivoted by vertically extending ears to the front-wheel and rear-wheel frames at their pivot points, and a seat member consisting of a strip of flexible material looped at one end about the seat-supporting bar and at the other end about the transverse portion of the horizontal frame and having a non-flexible plate therein adjacent the seat-supporting bar, said frames being adapted to collapse toward a substantially common and substantially horizontal plane when the handle is swung forwardly.

13. In a device of the class described, the combination with a U-shaped front-wheel frame, of a U-shaped rear-wheel frame pivoted thereto, a U-shaped handle frame pivoted to the open upper end of the front-wheel frame, a U-shaped horizontal frame pivoted at its open forward end to the open upper end of the rear-wheel frame and pivoted intermediate its ends to the handle frame, a seat-supporting bar pivoted by vertically extending ears to the front-wheel and rear-wheel frames at their pivot points, a seat member secured at its front end to the seat-supporting bar and at its rear end to the transverse portion of the horizontal frame, and a foot rest supported on the front-wheel frame toward the lower end thereof, said frames being adapted to collapse toward a substantially common and substantially horizontal plane when the handle is swung forward.

14. In a device of the class described, the combination with a U-shaped front-wheel frame, of a U-shaped rear-wheel frame pivoted thereto, a U-shaped handle frame pivoted to the open upper end of the front-wheel frame, a U-shaped horizontal frame pivoted at its open forward end to the open upper end of the rear-wheel frame and pivoted intermedite its ends to the handle frame, a seat-supporting bar pivoted by vertically extending ears to the front-wheel and rear-wheel frames at their pivot points, a seat member secured at its front end to the seat-supporting bar and at its rear end to the transverse portion of the horizontal frame, a foot rest pivoted in the front-wheel frame toward its lower end, and links connecting the foot rest with the rear-wheel frame, said frames being adapted to collapse toward a substantially common and substantially horizontal plane when the handle is swung forward.

15. In a device of the class described, the combination with a U-shaped front-wheel frame, of a U-shaped rear-wheel frame pivoted thereto, a U-shaped handle frame pivoted to the open upper end of the front-wheel frame, a U-shaped horizontal frame pivoted at its open forward end to the open upper end of the rear-wheel frame and pivoted intermediate its ends to the handle frame, a seat-supporting bar pivoted by vertically extending ears to the front-wheel and rear-wheel frames at their pivot points, a seat member secured at its front end to the seat-supporting bar and at its rear end to the transverse portion of the horizontal frame, and means for locking the parts in their extended position, said means consisting of a toggle joint secured at one end to the handle frame and at the other end to the horizontal frame, the handle frame having offsets therein so that when the bar is collapsed the folded toggle lies between the horizontal frame and the handle frame.

In witness whereof, I have hereunto set my hand this 10th day of May, 1929.

REINHARDT H. BROWN.